United States Patent
Deore et al.

(10) Patent No.: US 11,544,363 B2
(45) Date of Patent: Jan. 3, 2023

(54) FACIAL RECOGNITION FOR USER AUTHENTICATION

(71) Applicant: FAIR ISAAC CORPORATION, Roseville, MN (US)

(72) Inventors: Milind Madhukar Deore, Wilayah Persekutuan Kuala Lumpui (MY); Dabar Singh Parihar, Wilayah Persukutuan Kuala Lumpui (MY); Subhash Reddy K, Federal Territory of Kuala Lumpur (MY)

(73) Assignee: FAIR ISAAC CORPORATION, Roseville, MN (US)

( * ) Notice: Subject to any disclaimer, the term of this patent is extended or adjusted under 35 U.S.C. 154(b) by 400 days.

(21) Appl. No.: 16/781,846

(22) Filed: Feb. 4, 2020

(65) Prior Publication Data

US 2021/0240808 A1  Aug. 5, 2021

(51) Int. Cl.
*G06F 21/32* (2013.01)
*G06N 20/00* (2019.01)
*H04L 9/40* (2022.01)
*G06V 40/40* (2022.01)
*G06V 40/60* (2022.01)
*G06V 40/16* (2022.01)

(52) U.S. Cl.
CPC ............. *G06F 21/32* (2013.01); *G06N 20/00* (2019.01); *G06V 40/172* (2022.01); *G06V 40/45* (2022.01); *G06V 40/67* (2022.01); *H04L 63/0861* (2013.01); *G06F 2221/2133* (2013.01)

(58) Field of Classification Search
CPC . G06F 21/32; G06F 2221/2133; G06N 20/00; G06V 40/172; G06V 40/45

USPC .......................................................... 726/19
See application file for complete search history.

(56) References Cited

U.S. PATENT DOCUMENTS

| 5,482,048 A * | 1/1996 | Johnson ............... G06V 40/168 600/595 |
| 11,321,436 B2* | 5/2022 | Kim ........................ G06V 40/70 |
| 2014/0307929 A1* | 10/2014 | Nechyba ................ G06V 40/45 382/118 |
| 2020/0272717 A1* | 8/2020 | Figueredo de Santana ................. G06F 21/32 |
| 2020/0285840 A1* | 9/2020 | Neill ...................... H04N 7/183 |

(Continued)

OTHER PUBLICATIONS

Apple Support, "About Face ID advanced technology", Jan. 7, 2020, URL:https://web.archive.org/web/20200107170010/https://support.apple.com/en-us/HT208108 (Year: 2020).*

(Continued)

*Primary Examiner* — Venkat Perungavoor
*Assistant Examiner* — Peiliang Pan
(74) *Attorney, Agent, or Firm* — Mintz, Levin, Cohn, Ferris, Glovskyand Popeo, P.C.; F. Jason Far-hadian, Esq.

(57) ABSTRACT

Systems and methods for utilizing an image capture device to scan facial features of a user, responsive to recognition of a plurality of beam projection points on the face of the user. The first data captured from scanning the facial features may be authenticated against a facial depth map stored as a data structure in a data storage medium. In response to successful authentication, the facial features of the user may be continually scanned to detect facial movements indicative of the user's liveness. Access may be granted to the user, in response to verifying the user's liveness.

20 Claims, 4 Drawing Sheets

(56) References Cited

U.S. PATENT DOCUMENTS

| | | | | |
|---|---|---|---|---|
| 2020/0300970 A1* | 9/2020 | Nguyen | ................... | G01S 7/412 |
| 2020/0334347 A1* | 10/2020 | Hoyos | ................. | H04L 63/0861 |
| 2021/0006415 A1* | 1/2021 | Sun | ...................... | G06V 40/172 |
| 2021/0034896 A1* | 2/2021 | Wu | ....................... | G06V 40/172 |
| 2021/0097160 A1* | 4/2021 | Yang | ........................ | G06F 21/10 |
| 2021/0264009 A1* | 8/2021 | Hochrieser | .......... | G06V 40/172 |

OTHER PUBLICATIONS

Anonymous: "About Face ID advanced technology—Apple Support," Jan. 7, 2020 (Jan. 7, 2020), XP055802422, Retrieved from the Internet: URL:https://web.archive.org/web/20200107170010/https://support.apple.com/en-us/HT208108 [retrieved on May 7, 2021]. 3 pages.

* cited by examiner

FACIAL RECOGNITION FOR USER AUTHENTICATION

TECHNICAL FIELD

The disclosed subject matter generally relates to user authentication and, more particularly, to systems and methods that utilize facial recognition for the purpose of providing secure access to electronic content or systems.

BACKGROUND

Electronic systems and devices, such as computers and mobile communication devices, may be utilized to provide access to sensitive, confidential or proprietary content. For that reason, users who wish to access such content are routinely required to go through an authentication process by way of, among other things, entering usernames and passcodes.

Recent advances in technology have made it possible to use biometric features and related information for the purpose of authenticating human users. For example, retina scanning or facial recognition can be used to authenticate and verify the identity of a person before access is granted into a building or to an electronic device.

Depending on implementation, facial recognition technology may be configured to use a camera to scan facial features of a human operator or user during a registration process. The scan results can be used for the purpose of authentication at a later time, when the authorized user attempts to sign in.

One of the drawbacks of currently available facial recognition techniques is that an imposter may be able to use a two- or three-dimensional mask to impersonate the facial likeness of an authorized user and effectively bypass the implemented security measures. It is desirable to improve the current facial recognition technologies to overcome the stated shortcomings.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, systems and methods are provided for utilizing an image capture device to scan facial features of a user, responsive to recognition of a plurality of beam projection points on the face of the user. The first data captured from scanning the facial features may be authenticated against a facial depth map stored as a data structure in a data storage medium. In response to successful authentication, the facial features of the user may be continually scanned to detect facial movements indicative of the user's liveness. Access may be granted to the user, in response to verifying the user's liveness.

In more detail, an image capture device may be used for the purpose of scanning facial features of a user to generate first data from data captured from scanning the facial features. In certain embodiments, the first data may be compared or authenticated against second data stored as a data structure in a data storage medium. The second data may comprise a facial depth map created from scanning the facial features of the user. In response to successful authentication, the facial features of the user may be further scanned to detect facial movements indicative of the user's liveness so that access can be granted based on user liveness verification.

The verification may be at least partially based on the user providing a response to a prompt. The prompt may suggest or require the user to move one or more facial features. The authentication process may be terminated or restarted, in response to failed authentication of first data or failed verification of user's liveness, for example, after detecting a predetermined number of failed attempts by the user. In one example scenario, the user provides a response to the prompt by moving at least a facial feature of the user, while viewing an image of the user on a display screen.

In certain embodiments, the scanning may be responsive to recognition of a plurality of beam projection points on the face of the user. Based on information collected from scanning the facial features of the user, a computer-implemented learning model may be used to recognize, classify or generate landmark points with coordinates (X,Y). In response to the user moving one or more facial features, at least a first group of the plurality of beam projections associated with a prominent facial feature or landmark points on the face or other body parts of the user are detected.

Optionally, a moveable pointer may be constructed on the display screen, such that the movement of the pointer on the display screen is coordinated with the movement of the detected prominent facial feature as the user moves. In accordance with certain aspects of the disclosed subject matter, coordinates associated with the facial features are determined for one or more landmarks points (e.g., eyes' or lips' boundary lines) identified in the facial features. The coordinates associated with the facial features change as the user moves in three-dimensional space, such that the position of the pointer in a two-dimensional space of the display screen may be modified or updated in coordination with the change of the coordinates of the detected prominent feature in three-dimensional space.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
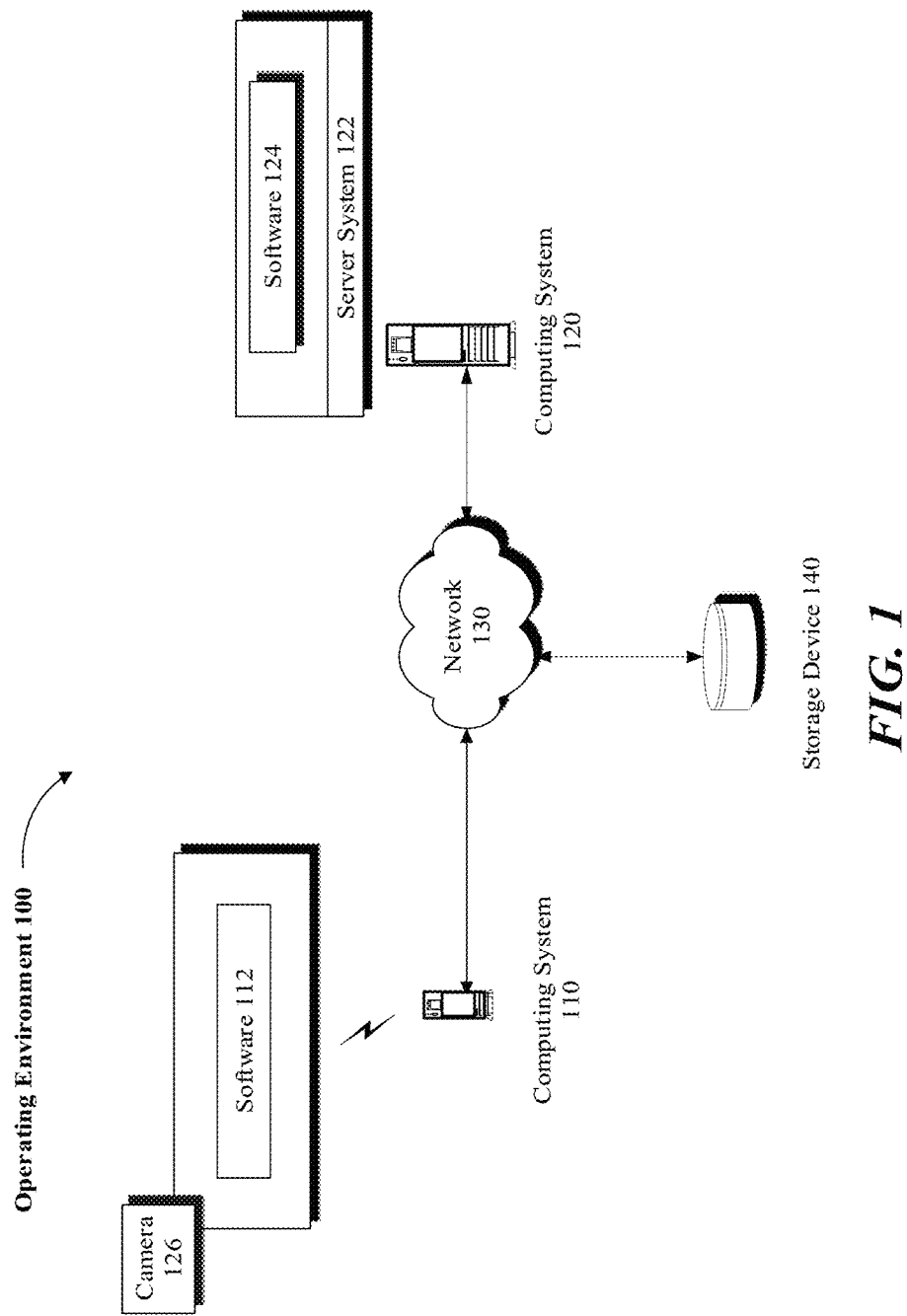
FIG. 1 illustrates an example operating environment in accordance with one or more embodiments, wherein recognition technology may be utilized for the purpose of user authentication.

Referring to FIG. 1, an example operating environment 100 is illustrated in which a computing system 110 may be used by a user to interact with a client authentication software 112 being executed on a computing system 110. The computing system 110 may be a general-purpose computer, a handheld mobile device (e.g., a smart phone), a tablet (e.g., an Apple iPad®), or other communication capable computing device equipped with or coupled to a camera 126. Camera 126 may be a true depth camera system configured to scan the facial, or other, features of a user with infrared light.

In one example embodiment, a beam of approximately 30,000 dots may be projected on to a human operator's face. The projected dots may be scanned and captured by camera 126 and converted to a facial depth map, which may be stored in a data structure in one or more storage devices which are locally or remotely coupled to computing system 110. In some implementations, the captured data from the scan may be turned into a mathematical representation that is stored in a storage device 140, for example, and may be used later for the purpose of authentication.

Software 112 may include or incorporate an artificial intelligence (AI) component (e.g., a machine learning model) that measures at least one or more of a three-dimensional facial depth, skin texture, eye reflections, or other visual features of a person's likeness. Software 112 may be also configured to detect the user's face and real-time liveness. Liveness refers to facial attributes like the outline of the lips, eyeballs or eyelids and other features of a user's face that can be animated during the authentication process, either voluntarily or involuntarily. For example, the user's blinking or movement of the user's lips may be detected as an indication that the user image being scanned by camera 126 is a real user, as opposed to a still image or mask.

False acceptance rate (FAR) (i.e., the percentage of identification instances in which unauthorized persons are incorrectly accepted) and false rejection rate (FRR) (i.e., the percentage of identification instances in which authorized persons are incorrectly rejected) may be adjusted for the machine leaning model to ensure a robust operation and effective authentication. Ideally, the weights and biases of the model, which may include a predictive learning algorithm, may be adjusted so that the ratio of FAR to FRR is less than 1% to minimize the probability of error in the authentication process and substantially limit the possibility of unauthorized access.

In accordance with some implementations, a machine-learning model may be trained with an initial set of data (e.g., training data) and later using historical event data to determine proper classification for one or more detected events. The events may be inputted to the model classified as live or not live based on event-related parameters processed by the model according to the past and ongoing training. The training may continue by iteratively adjusting parameters w and b, respectively associated with weights and biases for event-related input data. Values associated with the parameters w and b may be updated to adjust preferences given to one or more event-related parameters and to influence the computing model toward generating an outcome that is more accurate.

Referring back to FIG. 1, authentication software 112 may be implemented in a web browser, or in form of a dedicated app or other type of software application running either fully or partially on computing system 110. Computing system 110 may communicate over a network 130 to access or store data on storage device 140 or to access services provided by a computing system 120 on which server system 122 and authentication software 124 are executed. Depending on implementation, storage device 140 may be local to, remote to, or embedded in one or more of computing systems 110 or 120.

A centralized or distributed authentication system, such as server system 122, may be configured on computing system 120 to service one or more authentication or verification requests submitted by computing system 110 or authentication software 112 (e.g., client systems) via network 130. Network 130 may be implemented over a local or wide area network (e.g., the Internet). Computing system 120 and server system 122 may be implemented over a centralized or distributed (e.g., cloud-based) computing environment as dedicated resources or may be configured as virtual machines that define shared processing or storage resources.

Execution, implementation or instantiation of authentication software 124, or the related features and components (e.g., software objects), over server system 122 may also define a special purpose machine that provides remotely situated client systems, such as computing system 110 or software 112, with access to a variety of data and services. In accordance with one or more implementations, the provided services by the special purpose machine or software 124 may include providing a user, using computing system 110 or software 112, with authentication services that allows a user access content stored on computing system 110 or made available over network 130. In certain implementations, the authentication services may be utilized to determine, verify or confirm the identity of a user who wishes to enter a specific location or requires access to a particular system, device, application or content.

As shown in FIG. 1, camera 126 (or other image-recording system) may be utilized to capture, for example, facial biometric data in multiple phases. In a user registration or enrollment phase, a user may use computing system 110 to create a user profile and also setup secret credentials like a PIN code or password. The biometric data captured and credential information received at the registration phase may be stored locally on computing system 110 or be transferred to computing system 120 or stored remotely at storage device 140 for future access. At a user validation phase, a previously registered user may use computing system 110 or another computing system connected to network 130 to login. The login process may be for the purpose of accessing content or service provided via computing system 110 or to remotely login to computing system 120 to access data or services provided by server system 122 or software 124.

Figure 2:
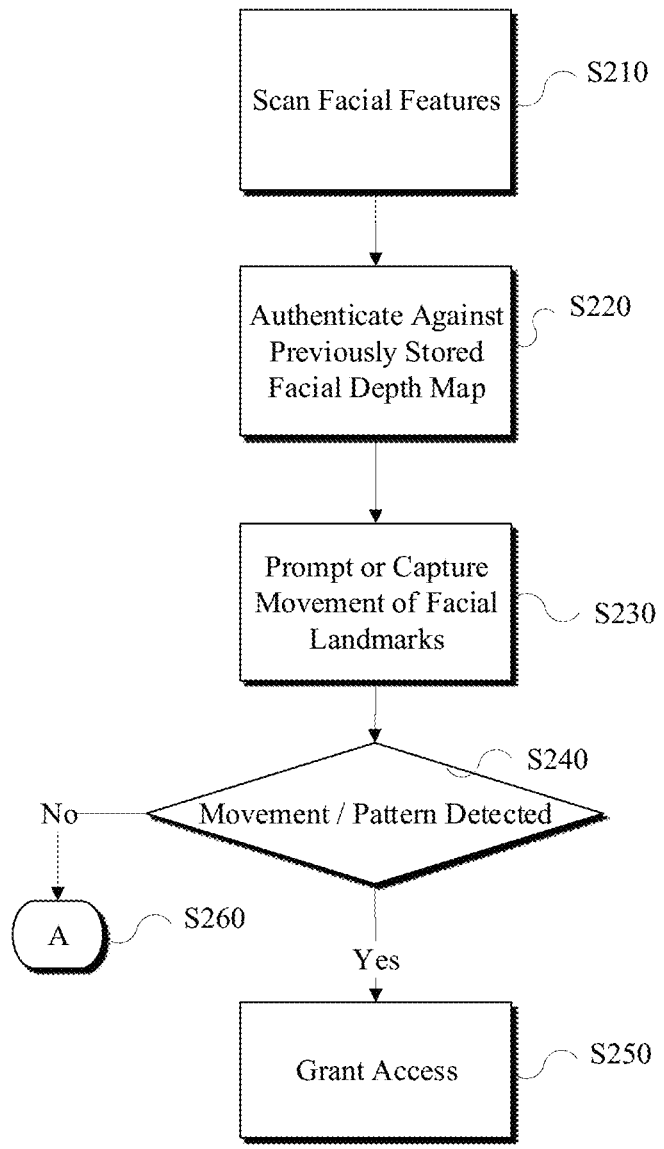
FIG. 2 is an example flow diagram of an authentication method, in accordance with one embodiment.

Referring to FIG. 2, at or during the validation phase, facial features of the user may be scanned using camera 126, for example (S210). In response to the scanning of the facial features, the user's biometric information may be collected by software 112 and compared or authenticated against the biometric information (e.g., a facial depth map) collected or created during the enrollment phase (S220). The biometric information stored in a data structure may be retrieved from storage device 140, for example. If the biometric information matches, the user may be prompted to provide additional credential information (e.g., one or more secret codes or patterns) as a further step of the authentication process.

The requirement for providing multiple levels or series of credential information or responding to prompted challenges is referred to as multi-step authentication. In certain embodiments, a higher level of detail in authentication (e.g., the requirement for providing multiple sets of information) provides for a more secure authentication process. However, an authentication process that is too lengthy or requires the memorization of too many secret parameters can be cumbersome for the user. On the other hand, an authentication process that requires the use of a small number of credential data or utilizes unsophisticated authentication procedures is likely to be easily breached and is therefore less secure.

Figure 3A:
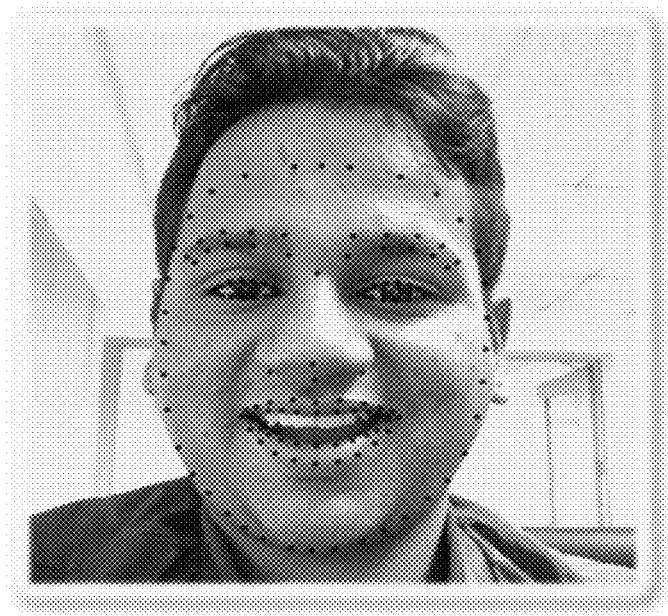
FIGS. 3A and 3B are examples of facially recognized landmarks and an unlock pattern, respectively, in accordance with one embodiment.

Referring to FIG. 3A, in one or more implementations, camera 126 may be used to capture facial images of the user and provide the captured image data to an AI self-learning model implemented over one or more of computing system 110 or computing system 120. The AI self-learning model may be a deep neural net (DNN) model that is pre-trained and is configured for capturing and classifying facial features and landmarks. In one example implementation, the DNN may be trained on facial landmarks that, as shown in FIG. 3, may be represented as annotations (e.g., dark dots, points or circles) on the face, eyes, eyebrows, nose, lips or other prominent boundaries of a user's facial features.

Accordingly, based on the collected information from scanning the user's facial features, the DNN model may recognized, classify or generate facial feature landmark points with coordinates (X,Y), for example. The facial feature landmark point coordinates may be stored in a storage device and be readily accessible. In certain embodiments, the landmark points may be displayed in a graphical user interface viewable by the user (e.g., on a display screen coupled to computing system 110) as overlapping a live image of the user being captured by camera 126. It may be possible to monitor consecutive incoming frames captured by camera 126 and detect the respective facial landmarks for the user over a predetermined period of time to generate a plurality of landmark points that are associated with a conspicuous facial feature (e.g., the nose) of the user.

Referring back to FIG. 2, using landmark points associated with at least one prominent feature of the user's face, software 112 may prompt the user to move the user's facial features so that the movement of the user's facial landmarks may be captured (S230). Such process would help ensure that the user is a live user that can respond to the prompt for a change in facial features and further helps ensure that the user is not wearing a mask with static features that cannot be controlled by the user. For example, the user may be prompted to raise his eyebrows, blink a certain number of times, utter a certain word or move his lips in a certain fashion. Software 112, in one or more embodiments, may have been trained to recognize the changes in the user's facial features and determine whether the user's response matches the prompts or instructions presented to the user for the purpose of authentication.

It is noteworthy that the recognition environment and technology provided herein is defined as applicable to a user's facial features by way of example. In other embodiments or implementations, software 112 may be configured to recognize or categorize other features of a user (e.g., certain hand or figure movements or animations associated with other user body parts). Referring back to FIG. 2, if in response to a provided prompt, the user successfully moves the designated facial features (or body parts) in the indicated manner (S240), then it may be determined that the multiple steps of the authentication process have been satisfactorily completed and the user will be granted access to the intended system, device or content (S250). Otherwise, software 112 may take an appropriate action, such as restarting or terminating the authentication process or issuing some kind of an alert after a predetermined number of failed attempts (S260).

The number of failed attempts may be associated with the number of times the user has failed to authenticate at different stages of authentication. For example, by default, the user may be given two chances for authentication based on a facial scan, at a first stage, and three chances for correctly responding to a prompt by moving a particular body part in front of the camera 126, at a second stage. If the user fails the facial scan beyond a predetermined number of times (i.e., a first threshold), then the authentication process may be terminated or restarted. In one implementation, additional prompts or challenges beyond a default number of prompts may be provided, if for example, the user fails to authenticate during the first stage beyond a predetermined threshold. For example, during the first stage, if the user's face has to be scanned three times to successfully authenticate, instead of a single challenge or prompt, the user may be asked to successfully respond to three prompts or challenges for moving a facial feature, during the second stage.

Figure 3B:
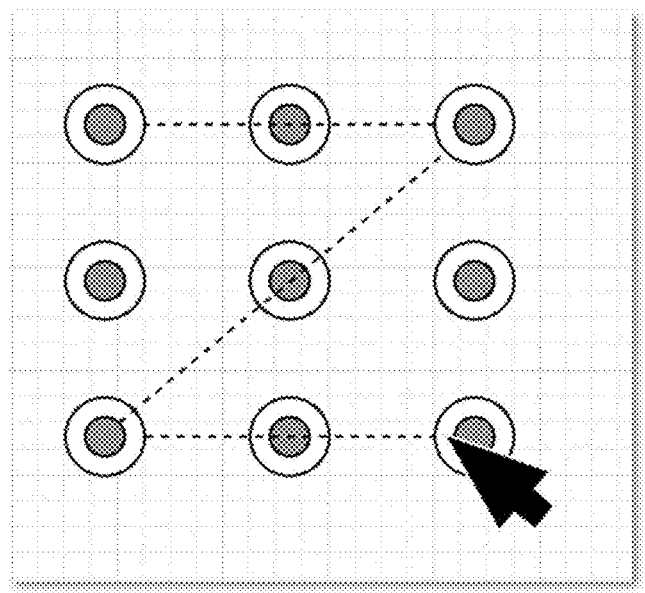

Referring to FIG. 3B, in certain variations, software 112 may capture the user movements and based on the changes detected in the coordinates of the landmark points of the user's facial features reconstruct a graphical cursor (e.g., a controllable pointer) on a graphical user interface viewable to the user. For example, a cursor or pointer may be constructed on a display screen that the user can see and follow. Depending on implementation, the cursor may be controllable by the user, as responsive to the movements of the user's head or other body parts. For example, in the implementation noted earlier, if the user's nose is designated or detected as the most prominent facial feature, then when the user moves his head to the left or to the right, or up or down, then the movement pattern of the reconstructed graphical cursor may follow the movement pattern of the user's nose in 3D space as transformed onto the 2D space on the screen.

As shown in FIG. 3B, for example, the user may move his head such that the movement of the user's nose in the 3D space, in conjunction with the reconstructed pointer on the screen, mimics the letter Z when transformed on the 2D plane of a display screen. If in the registration phase, the user had selected or designated an unlock pattern such as that displayed in FIG. 3B (e.g., a Z-shaped pattern going through predetermined points on a 2D grid) and the user can successfully reconstruct the unlock pattern by way of his head movements, then the user would be able to complete the next authentication step.

Accordingly and advantageously, the improved authentication system and technology disclosed herein may be configured for face detection, face validation and liveness determination. As provided above, the improved authentication steps for face validation and liveness may be based on tracking a user's movements, particularly the movements in specific predefined and pre-recognized facial features in 3D space, as controlled by the user.

The improved authentication technology serves multiple purposes. The computer-implemented authentication technology may be used as a means to verify the user is an authentic (i.e., known) user based on facial recognition of the particular user. Further, the technology provides a technical improvement in that it may be used to verify that the facial features being recognize are live. In other words, a user that is recognized based on a facial scan would still fail authentication, if the user cannot animated particular facial features as prompted by the system. For example, an imposter with a static 2D or 3D mask would fail authentication because a mask's facial features cannot be animated.

In some implementations, additional authentication steps for verifying liveness may require the user to animate body parts other than, or in addition to, the user's facial features. Furthermore, the user may be prompted to solve a challenge or to provide additional authentication credentials, such as providing an unlock pattern using a DNN model that facilitates the construction of a pointer on a screen based on the recognized X,Y coordinates of facial landmarks. The recognized coordinates may, for example, be associated with the coordinates of a prominent facial feature (e.g., nose, eyes, and lips) or other features of the user's face or user's body parts.

Depending on implementation, if a challenge requires the user to draw a certain unlock pattern using a facial feature, a special filter may be used to help smoothen imprecise movements. For example, a Kalman filter may be utilized based on a linear quadratic estimation (LQE) algorithm that uses a series of measurements for facial movements of the user. Statistical noises and other inaccuracies in the movement may be measured to produce estimates of variables that tend to be more accurate than those based on a single measurement, estimating a joint probability distribution over the variables, and to help smoothen or correct small inaccuracies (e.g., jagged edges) in a line drawn responsive to the user movements.

In certain embodiments, the scanning of a user's face by camera 126 may continue after initial authentication. Such continued scanning helps prevent unauthorized users from taking over an authorized session by, for example, forcing a validated user away or taking his place. Challenges or prompts or the entire authentication process may be renewed, if for example it is detected that the user's facial features have changed or more than one face enters the camera's scanning range.

Figure 4:
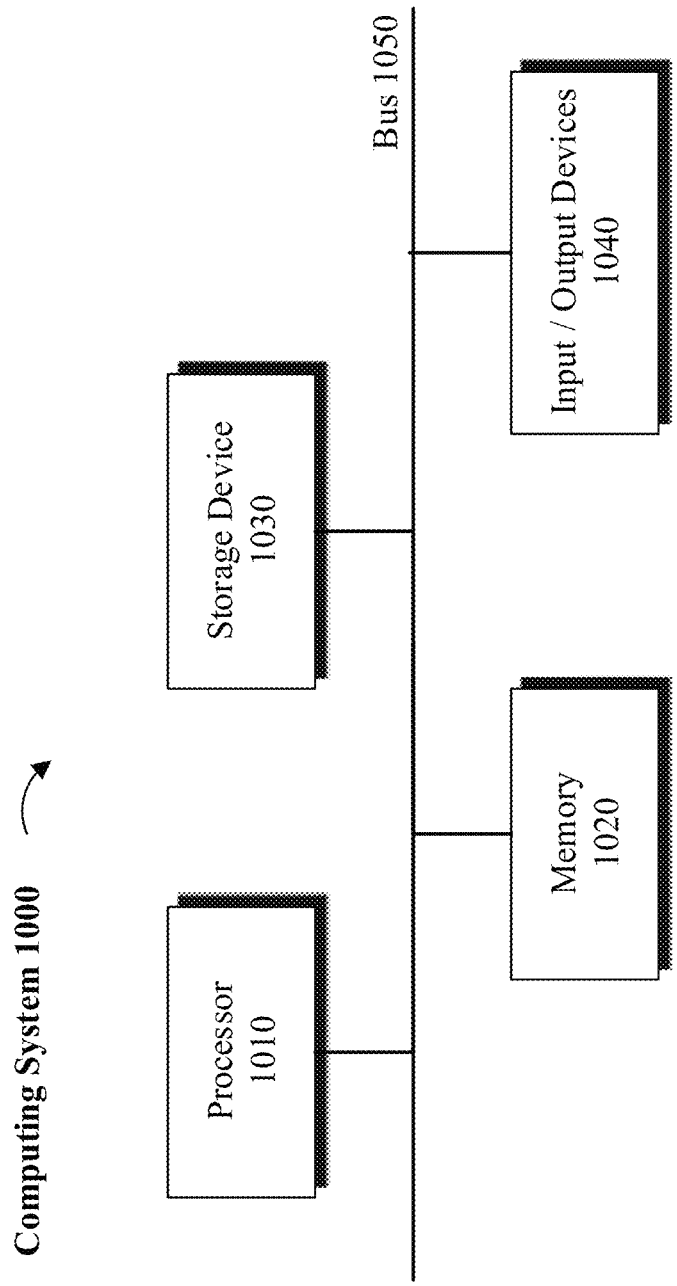
FIG. 4 is a block diagram of an example computing system that may be utilized to perform one or more computing operations or processes as consistent with one or more disclosed features.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
   using an image capture device, scanning facial features of a user to generate first data from data captured from scanning the facial features;
   authenticating the first data against second data stored as a data structure in a data storage medium;
   continuing to scan the facial features of the user to detect facial movements indicative of the user's liveness;
   granting access to the user, in response to verifying the user's liveness, the verification of the user's liveness being at least partially based on the user providing a response to a prompt, the prompt being generated to instruct the user to move a user's identified body part according to the prompt's instructions, the movement of the identified body part being traced on a display screen by way of a pointer associated with a point on the identified body part, the pointer tracing an unlock pattern on the display screen, the unlock pattern having been previously stored in a data storage medium associated with the user; and
   terminating or restarting the authenticating, in response to determining at least one of failed authentication of the first data against the second data, or failed verification of user's liveness after a predetermined number of failed attempts by the user.

2. The method of claim 1, wherein the prompt is for the user to move one or more facial features.

3. The method of claim 1, wherein the user provides a response to the prompt by moving at least a facial feature of the user while viewing an image of the user on the display screen.

4. The method of claim 3, wherein the scanning is responsive to recognition of a plurality of beam projection points on the face of the user, the method further comprising:
   in response to the user moving the one or more facial features, detecting at least a first group of the plurality of beam projections associated with a prominent facial feature of the user; and
   constructing the pointer on the display screen, the movement of the pointer on the display screen being coordinated with the movement of the detected prominent facial feature as the user moves.

5. The method of claim 4, wherein coordinates associated with the facial features are determined for one or more landmarks points identified in the facial features.

6. The method of claim 5, wherein the coordinates associated with the facial features change as the user moves in three-dimensional space, the method further comprising:
   modifying the position of the pointer in a two-dimensional space of the display screen in coordination with the change of the coordinates in three-dimensional space.

7. The method of claim 5, wherein based on collected information from scanning the facial features of the user, a computer-implemented learning model may be used to recognize, classify or generate the landmark points with coordinates (X,Y).

8. The method of claim 3, wherein the prompt comprises tracing an unlock pattern on a grid displayed on the display screen.

9. The method of claim 1, wherein the scanning is responsive to recognition of a plurality of beam projection points on the face of the user.

10. The method of claim 1, wherein the second data comprises a facial depth map created from scanning the facial features of the user.

11. A system comprising:
    at least one programmable processor; and
    a non-transitory machine-readable medium storing instructions that, when executed by the at least one programmable processor, cause the at least one programmable processor to perform operations comprising:
    scanning facial features of a user, responsive to recognition of a plurality of beam projection points on the face of the user;
    authenticating first data captured from scanning the facial features against a facial depth map stored in a data storage medium;
    continuing to scan the facial features of the user to detect facial movements indicative of the user's liveness; and
    granting access to the user, in response to verifying the user's liveness, a prompt being generated to instruct the user to move a user's identified body part according to the prompt's instructions, the movement of the identified body part being traced on a display screen by way of a pointer associated with a point on the identified body part, the pointer tracing an unlock pattern on the display screen.

12. The system of claim 11, wherein a prompt is provided for the user to move one or more facial features.

13. The system of claim 12, wherein the user provides a response to the prompt by moving at least a facial feature of the user.

14. The system of claim 11, wherein the authentication process is terminated, in response to determining failed authentication of first data.

15. The system of claim 11, wherein the authentication process is terminated, in response to determining failed verification of user's liveness.

16. A computer program product comprising a non-transitory machine-readable medium storing instructions that, when executed by at least one programmable processor, cause the at least one programmable processor to perform operations comprising:
- utilizing an image capture device to scan facial features of a user, responsive to recognition of a plurality of beam projection points on the face of the user;
- authenticating first data captured from scanning the facial features against a facial depth map stored as a data structure in a data storage medium;
- in response to successful authentication, continuing to scan the facial features of the user to detect facial movements indicative of the user's liveness; and
- granting access to the user, in response to verifying the user's liveness, a prompt being generated to instruct the user to move a user's identified body part according to the prompt's instructions, the movement of the identified body part being traced on a display screen by way of a pointer associated with a point on the identified body part, the pointer tracing an unlock pattern on the display screen.

17. The computer program product of claim 16, wherein a prompt is provided for the user to move one or more facial features.

18. The computer program product of claim 16, wherein the authentication process is terminated, in response to determining failed authentication of first data.

19. The computer program product of claim 16, wherein the authentication process is terminated, in response to determining failed verification of user's liveness.

20. The computer program product of claim 16, wherein the user provides a response to the prompt by moving at least a facial feature of the user.

* * * * *